E. H. STROUD.
DUST COLLECTOR.
APPLICATION FILED JUNE 16, 1919.
1,416,995.
Patented May 23, 1922.
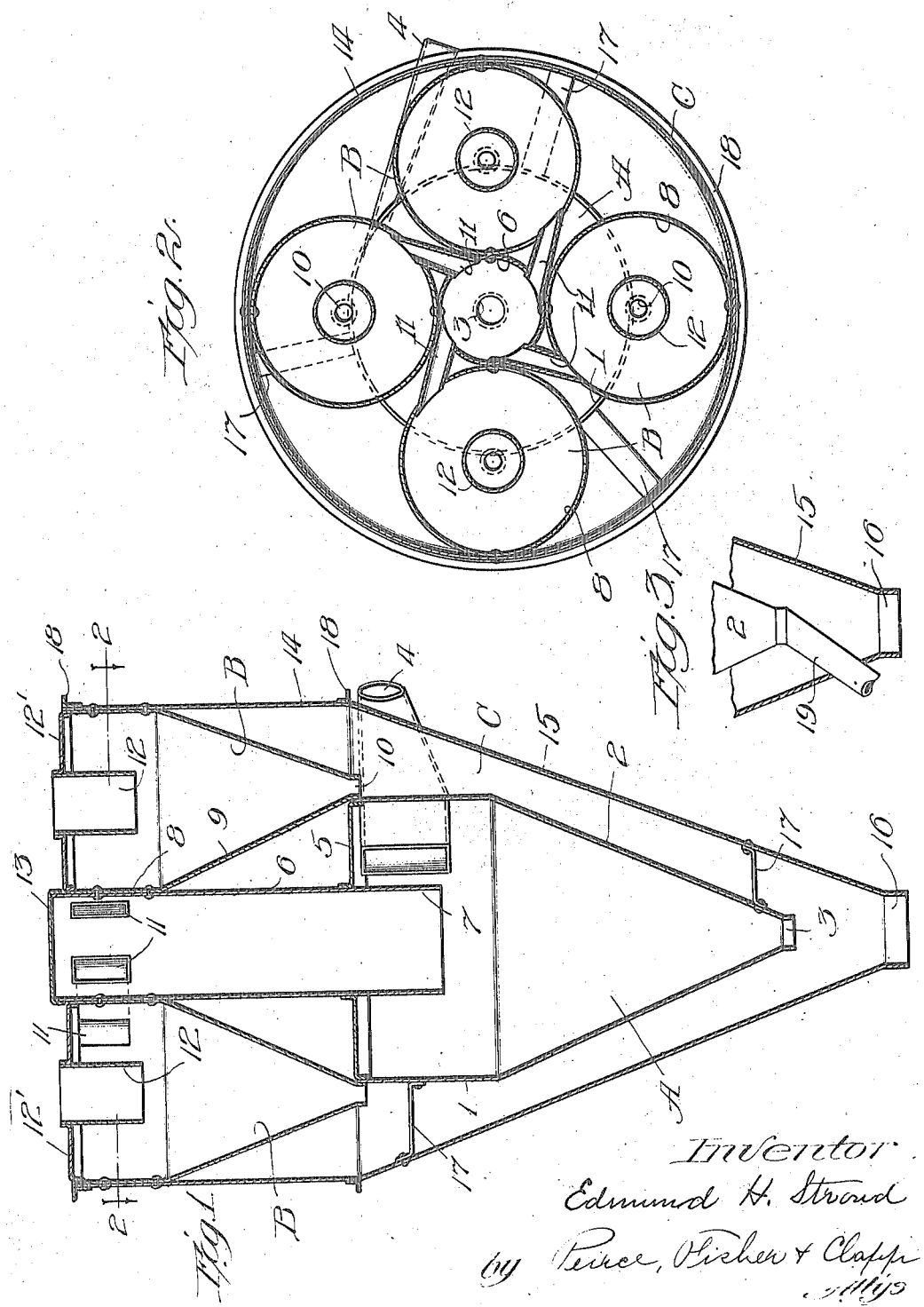

UNITED STATES PATENT OFFICE.

EDMUND H. STROUD, OF CHICAGO, ILLINOIS.

DUST COLLECTOR.

1,416,995. Specification of Letters Patent. Patented May 23, 1922.

Application filed June 16, 1919. Serial No. 304,446.

*To all whom it may concern:*

Be it known that I, EDMUND H. STROUD, a citizen of the United States, and a resident of Chicago, county of Cook, and State of Illinois, have invented certain new and useful Improvements in Dust Collectors, of which the following is a specification.

The invention relates to dust collectors and more particularly to those of the centrifugal type and seeks to provide an improved construction which not only removes the greater portion of the dust or other like material contained in the body of air entering the collector, but also removes the small percentage of fine dust which passes through the air outlet of ordinary centrifugal dust collectors now in use and is either lost or must be removed in some way, for example, by passing the escaping air through a cloth or other filtering medium.

In accordance with the present invention a primary dust collector is provided in which a stream of air, or the like, laden with dust, powder or materials consisting of small particles is expanded and brought into frictional contact with metal surfaces to thereby effect the removal by precipitation of the bulk of the material, and a plurality of secondary collectors are provided for further expanding substantially the entire body of air and causing further travel thereof in contact with additional frictional surfaces to thereby separate substantially all the remaining material. The primary and secondary collectors are preferably of the well-known centrifugal type in which the air is maintained in rotary motion and the separation of material therefrom aided by centrifugal action. The primary and secondary collectors are so proportioned that the combined cubical contents of the secondary collectors is sufficiently greater than that of the primary collector to properly effect a second expansion of the air and also so that the combined paths of travel and the extent of contact of the air with frictional surfaces in the secondary collectors are increased in a much greater degree to effectively remove the fine residual material.

The invention further consists in the features of improvement hereinafter set forth, illustrated in the preferred form in the accompanying drawings and more particularly pointed out in the appended claims.

In the drawings, Figure 1 is a vertical section of the improved dust collecting apparatus. Figure 2 is a horizontal section on the line 2—2 of Fig. 1. Figure 3 is a vertical section of the lower portion of the apparatus illustrating a modification.

The primary dust collector A is of the centrifugal or so-called "cyclone" type and comprises an upper cylindrical portion 1 and a lower conical portion 2 provided at its lower end with a discharge outlet 3 for the dust or other like material separated in the primary collector. The upper cylindrical portion is provided with the usual tangential inlet 4, an upper wall or top 5 and with an axial, vertically extending air outlet pipe 6 the lower end of which extends within the upper cylindrical portion 1 to form the usual tubular guard 7.

A plurality of relatively small secondary dust collecting chambers B are arranged above the primary dust collecting chamber A and preferably in a circular series about the air outlet pipe 6 which leads from the primary dust collector. In the form shown, there are four secondary dust collecting chambers B which are considerably smaller than the primary dust collector but are similar in construction, being provided with upper cylindrical portions 8, lower conical portions 9, dust outlets 10 and air inlets and outlets 11 and 12. The air inlets 11 extend from the upper end of the primary outlet pipe 6 and are preferably tangentially disposed both with reference to the upper ends of the secondary dust collecting chambers and also with reference to the cylindrical air outlet pipe 6. The air inlets 11 are arranged to effect the swirling of the air in the secondary collectors B in the same direction as the tangential inlet 4 of the primary collector, so that the rotary motion of the air created in the primary collector is maintained in the outlet pipe 6 and in the secondary collectors. The upper end of pipe 6 is closed so that all the air passing from the primary chambers passes through and is further expanded in the secondary chambers. A cap 13 closes the upper end of the pipe 6 in air-tight fashion but preferably it is removably held in position so that if desired access may be had to the interior of the pipe 6 and inlets 11, for cleaning purposes. The tubular air outlet pipes 12, as shown, extend within the upper cylindrical portions of the secondary chambers to form guards, and a circular top 12' extends over all the secondary chambers.

In the preferred construction shown, the primary and secondary chambers are all arranged within a large outer casing C which is similar in form to any one of the chambers, that is to say, it is provided with an upper cylindrical portion 14 and a lower conical portion 15 having an outlet 16 at its lower end. The secondary collecting chambers are secured at their upper ends, as by means of rivets, to the upper ends respectively of the pipe 6 and cylindrical portion 14. The primary collecting chamber A is suitably mounted and held in place within the lower conical portion of the outer casing, as by means of braces 17. The entire construction is made of sheet or plate steel and can be suitably reinforced where necessary with angle irons or bars. In the form shown, the outer cylindrical portion 14 of the outer casing is provided with reinforcing angle bars 18 by which the structure can be supported.

In operation, a body of air under pressure and laden with powdered material, dust or the like, passes into the inlet 4 of the primary dust collecting chamber and whirls around therein in contact with its interior friction surfaces so that the greater body of material is separated by the expansion of the air, the action of gravity, and centrifugal force, and by frictional contact with the deflecting walls of the chamber. As stated, substantially the greater portion of the material, usually about 90%, will be separated from the stream of air in the primary chamber, although, of course, the percentage will vary under different conditions. The air passing from the primary chamber through the pipe 6 thereafter is divided into a plurality of streams and passes into the upper ends of the secondary chambers B, where it is further expanded and whirled in frictional contact with the deflecting walls thereof.

By providing a plurality of relatively small secondary collectors they can be correctly shaped and readily proportioned so that their combined cubical contents will be sufficiently greater than that of the primary collector to effect a second expansion of the air and at the same time, the total path of movement of the air in contact with frictional surfaces in the secondary collectors is increased to a much greater degree. While the proportions and arrangement of the primary and secondary collectors can be varied somewhat to suit different conditions, they are preferably substantially as shown in the accompanying drawings in which the parts of the secondary collectors, while smaller, are of substantially the same relative proportions as the corresponding parts of the primary collector. That is to say, in each of the collecting chambers the upper cylindrical portion is about one-half the height of the lower conical portion, and the discharge outlet is about one-third of the diameter of the upper cylindrical portion or slightly larger and projects downwardly into the upper portion of the collector for a distance equal to about one-half or two-thirds of the height of the cylindrical portion thereof. Where four relatively small secondary collectors are provided, as in the preferred form shown, the height and diameter of each secondary collector is preferably about 70 per cent of the corresponding dimensions of the primary collector. With this arrangement the combined cubical contents of the secondary collectors will be about 40 per cent greater than the cubical contents of the primary collector, but the total path of movement for the air in contact with frictional surfaces in the secondary collectors will be nearly three times as great as that in the primary collector. Experience has shown that with this arrangement the fine residual material remaining in the air that passes from the primary collector is effectively removed by the secondary collectors.

In the form shown in Figs. 1 and 2, the dust outlet 3 of the primary chamber and the dust outlets 10 of the secondary chambers open into the outer casing and the separated material passes from the latter through the outlet 16 at its lower end. If desired, the material removed in the primary and secondary chambers can be separately collected by providing the outlet 3 of the primary chamber with an extension 19 leading through the outer casing, as shown in Fig. 3.

Obviously, changes may be made in the details set forth without departure from the essentials of the invention as defined by the claims.

I claim as my invention:—

1. In combination, a primary dust collecting chamber and a plurality of secondary dust collecting chambers, said chambers having dust outlets, peripheral air inlets and axial air outlets, means for conducting the air passing from said primary chamber to the air inlets of said secondary chambers, and a casing enclosing said chambers for receiving material therefrom, said casing having a conical lower portion provided with a common dust outlet at its lower end.

2. In combination, a primary dust collecting chamber and a series of relatively smaller dust collecting chambers for effecting multiple expansion of a body of air laden with powdered material or dust, said chambers having air inlets, dust outlets at their lower ends and air outlets at their upper ends, said secondary chambers being arranged above said primary chambers and having their air inlets communicating with the air outlet of said primary chamber, and a casing enclosing said chambers and adapted to receive the collected material therefrom.

3. In combination, a primary centrifugal dust collector for separating the bulk of the material from a stream of air laden with powdered material or dust, a plurality of relatively smaller secondary centrifugal dust collectors adapted to receive the air from said primary collector to separate the remaining material, and a casing wherein said collectors are mounted, said casing being adapted to receive material from said collectors and having a conical lower portion provided with a common dust outlet.

4. In combination, a primary centrifugal dust collector for separating the bulk of the material from a stream of air laden with powdered material or dust, and a plurality of relatively smaller secondary centrifugal dust collectors for receiving the air from said primary collector and separating the remaining material therefrom, said collectors having dust outlets at their lower ends and tangential air inlets and axial air outlets at their upper ends, and said secondary collectors being arranged in a circular series about the axial air outlet of the primary collector and having their air inlets in communication with the air outlet of said primary collector.

5. In combination, a primary centrifugal dust collector for separating the bulk of the material from a stream of air laden with powdered material or dust, a plurality of relatively smaller, secondary centrifugal dust collectors for receiving the air from said primary collector and separating the remaining material therefrom, said collectors having dust outlets at their lower ends and tangential air inlets and axial air outlets at their upper ends, and said secondary collectors being arranged above said primary collector and having their air inlets in communication with the air outlet of said primary collector, and an enclosing casing wherein said collectors are mounted for receiving material therefrom, said casing having a conical lower portion provided with a common dust outlet at its lower end.

6. In combination, a primary centrifugal dust collector for separating the bulk of the material from a stream of air laden with powdered material or dust, a plurality of relatively smaller secondary centrifugal dust collectors adapted to receive the air from said primary collector to separate the remaining material, said collectors having tangential air inlets, dust outlets at their lower ends and axial air outlets at their upper ends, said secondary collectors being arranged in a circular series above said primary collector and having their air inlets in communication with the air outlet of the primary collector, and a casing wherein said collectors are mounted.

7. A multiple expansion dust collector for separating powdered material or dust from a stream of air laden therewith, comprising a primary centrifugal dust collector for initially expanding the stream of air to separate the bulk of material therefrom, and a plurality of relatively smaller, secondary centrifugal dust collectors for further expanding the air passing from said primary collector to separate the remaining material, the said primary and secondary collectors being so proportioned that the increase in the combined cubical contents of the secondary collectors as compared with that of the primary collector is relatively small, and the increase in the total path of movement of the air through the secondary collectors as compared with that through the primary collector is relatively large, substantially as described.

8. A multiple expansion dust collector, comprising a primary centrifugal dust collector for initially expanding a stream of air to separate the bulk of material therefrom, and a plurality of relatively smaller but similarly proportioned, secondary centrifugal dust collectors for further expanding the air passing from said primary collector to separate the remaining material, said collectors having dust outlets at their lower ends and tangential air inlets and axial air outlets at their upper ends, said secondary dust collectors being arranged in a series about the air outlet of said primary dust collector and having their air inlets communicating with the primary air outlet, tangentially disposed with reference thereto and arranged to effect the swirling of the air in the same direction as the tangential air inlet of said primary collector.

EDMUND H. STROUD.